(12) United States Patent
Conan et al.

(10) Patent No.: US 8,842,659 B2
(45) Date of Patent: Sep. 23, 2014

(54) ROUTING METHOD INTENDED FOR INTERMITTENTLY CONNECTED NETWORKS

(75) Inventors: Vania Conan, Paris (FR); Jeremie Leguay, Paris (FR); Timur Friedman, Paris (FR)

(73) Assignee: Thales, Neuilly sur Seine (FR)

( * ) Notice: Subject to any disclaimer, the term of this patent is extended or adjusted under 35 U.S.C. 154(b) by 893 days.

(21) Appl. No.: 12/520,861

(22) PCT Filed: Dec. 21, 2007

(86) PCT No.: PCT/EP2007/064438
§ 371 (c)(1),
(2), (4) Date: May 4, 2010

(87) PCT Pub. No.: WO2008/077936
PCT Pub. Date: Jul. 3, 2008

(65) Prior Publication Data
US 2010/0214934 A1 Aug. 26, 2010

(30) Foreign Application Priority Data
Dec. 22, 2006 (FR) ...................................... 06 11258

(51) Int. Cl.
H04L 12/28 (2006.01)
H04L 12/701 (2013.01)
H04L 12/721 (2013.01)
H04L 12/707 (2013.01)

(52) U.S. Cl.
CPC ................ H04L 45/00 (2013.01); H04L 45/32 (2013.01); H04L 45/24 (2013.01)
USPC ......................................... 370/351; 370/400

(58) Field of Classification Search
CPC ......... H04L 45/02; H04L 45/04; H04L 45/10; H04L 65/00; H04L 45/00
USPC ............ 370/389, 401, 395.31, 402, 351, 360, 370/396, 397, 395.21, 395.32
See application file for complete search history.

(56) References Cited

U.S. PATENT DOCUMENTS 6,990,103 B1 * 1/2006 Gollamudi ............... 370/395.31
2001/0036810 A1 11/2001 Larsen
2006/0268877 A1 * 11/2006 Gollamudi ..................... 370/392

OTHER PUBLICATIONS

Jones, et al,; "Practical Routing in Delay-Tolerant Network" Aug. 22, 2005, pp. 1-7.

(Continued)

Primary Examiner — Brenda H Pham
(74) Attorney, Agent, or Firm — Stroock & Stroock & Lavan LLP

(57) ABSTRACT

A routing method in a network with intermittent connectivity, characterized in that it includes, to determine the routing information, for an opportunistically defined routing, for a network comprising a number n of nodes, kmax being the maximum number of relays to be considered in the routing, and $M_1$, a matrix of size n×n, iterative steps of estimating the delay with (k+1) hops and the list of corresponding relays from $\langle\lambda_{ij}\rangle$ matrix of the inverses of the average inter-contact times and of the estimates of delays with k hops present in $M_k$, storing the estimated inter-contact delays in the matrix $M_{(k+1)}$ (i,j) and the list of the corresponding relays $V_i(d)^{k+1}$, ($M_{(k+1)}$ (i,j), $V_i(d)^{k+1}$), where $V_i(d)^{k+1}$) corresponds to the list of the relay nodes considered at the node i when a message must be transmitted to the destination d, for a number of relays k+1.

4 Claims, 2 Drawing Sheets

(56) References Cited

OTHER PUBLICATIONS

Lindgren A Doria Lulea University of Technology A: "Probabilistic Routing Protocol for Intermittently Connected Networks" IETF Standard-Working-Draft, Internet Engineering Task Force, IETF, CH, Jun. 9, 2005.

Jain, et al,: "Routing in a Delay Tolerant Network" Computer Communication Review, ACM, New York, vol. 34, No. 4, Oct. 2004, pp. 145-157.

Raul, et al. "Modeling and Analysis of Opportunistic Routing in Low Traffic Scenarios" Modeling and Optimization in Mobile, AD Hoc and Wireless Networks, 2005. WIOPT 2005. Third International Symposium on Riva Del Garda, Trentino, Italy Apr. 6, 2005, pp. 294-304.

Biswas, et al, "Opportunistic Routing in Multi-Hop Wireless Networks" Computer Communication Review, ACM, New York, vol. 34, No. 1, Jan. 2004; pp. 69-74.

Grossglauser, et al; "Mobility increases the capacity of ad-hoc wireless networks" proceedings IEEE Infocom 2001. The Conference on Computer Communications. 20th Annual Joint conference of the IEEE Computer and Communications Societies. Anchorage, AK, Apr. 22-26, 2001, vol. 1 of 3. conf. 20, pp. 1360-1369.

* cited by examiner

ROUTING METHOD INTENDED FOR INTERMITTENTLY CONNECTED NETWORKS

CROSS-REFERENCE TO PRIOR APPLICATION

This is a U.S. National Phase Application under 35 U.S.C. §371 of International Application No. PCT/EP2007/064438, filed Dec. 21, 2007, and claims benefit of French Patent Application No. 0611258, filed Dec. 22, 2006, both of which are incorporated herein. The International Application was published in French on Jul. 3, 2008 as WO 2008/077936 under PCT Article 21 (2).

TECHNICAL FIELD

The invention relates notably to a routing method in networks where connectivity is intermittent.

The expression "intermittent connectivity" designates all the networks in which users, resources, IP (Internet Protocol) addresses or any other type of object, are connected intermittently, not continuously in time. This can also tally with the concept of unstable connectivity where breaks are observed in the connection mechanism.

It relates notably to a method and a system making it possible to generate useful information for the routing of messages within a network made up of nodes that are interlinked, the links between the nodes being able to be interrupted intermittently.

Hereinafter in the description, the expression "opportunistically-defined routing" should be understood to mean a routing for which, when a node A enters into contact with a node B, the routing information makes it possible to decide which messages A must send to B.

BACKGROUND

The networks where connectivity is intermittent are characterized by the fact that many links suffer high loss rates, or even long propagation delays, so leading to the partitioning, subdividing of the network into a number of parts, within which the transmissions are good. Thus, the usual communication modes (for example, the TCP protocol, transport communication protocol) that rely on the existence of end-to-end paths, fail. The problem with the routing of the information is therefore to provide a method that enables a message to be routed from a source to a destination in this context. FIG. 1 shows an exemplary "connectivity chart" for the type of networks to which the inventive method applies. The nodes A, B, C, D and E in the chart represent the communicating entities and the bridge lines [A, B], [B, C], etc., correspond to the level of connectivity between the nodes. The higher the frequency of the dots of a bridge line, the fewer nodes are interconnected. On this chart, it can be seen that, whereas A and B are permanently connected, A and F are never connected and B and E are intermittently connected. A connectivity chart is, generally, represented by a parameter L, the width of the chart, a number n of nodes and the average degree of the chart D.

These networks are, for example, commonly referred to as delay tolerant networks (DTN). The DTNs are made up of entities or nodes, which communicate (communicate between themselves), and are mobile and wireless. These units are, for example, personal computers or personal data assistants (PDA), cell phones, sensors, etc. At any instant, communication is possible only between the nodes that are within radio range and, because of the very low level of connectivity, the probability that an end-to-end path (an existing and uninterrupted routing path) exists between two given entities is almost zero. Since data packets cannot be relayed using conventional IP (Internet Protocol) routing mechanisms, the relaying is then based on the store and forward principle. When an entity receives a message to be transmitted, it retains it until it encounters the recipient or else it transmits it opportunistically to a relay that can be selected according to a particular strategy.

Ad hoc networks to the emergency intervention services such as fire and police for example, or those used for military communications, can also change their communication mode in normal conditions (protocols of the MANET—mobile ad hoc networking—type, an autonomous system technology for mobile nodes) for a "disconnected" mode. The disconnections in these networks arise because of the mobility of the nodes, wireless-related problems, or the disappearance of nodes (lack of batteries, destruction, etc.). The invention described in this document can be applied in this context in order to maintain a "best effort" message routing service.

Various routing methods for this type of network are known from the prior art.

The documents by A. Lindgren, A. Doria, and O. Schelen, "Probabilistic routing in intermittently connected networks", in Proc. SAPIR, 2004 and J. Burgess, B. Gallagher, D. Jensen, and B. N. Levine, "MaxProp: Routing for Vehicle-Based Disruption-Tolerant Networks" in Proc. Infocom, 2006, describe routing methods based on probabilistic approaches. Such approaches are not based on the expectancy of the inter-contact times between the nodes. It is therefore difficult to estimate the delay to reach a destination. Furthermore, they have a more or less long term memory dependent on scale factors which are difficult to estimate.

In the document by S. Jain, K. Fall, and R. Prata, "Routing in a Delay Tolerant Network" in Proc. SigComm2004, the method calculates "the shortest paths" in a valued chart (chart in which weights are attributed to the bridge lines) with the average inter-contact delays between the nodes. This approach suffers from a lack of opportunism in the transmission possibilities that it implements and too strictly defines the sequence of the relays that must be used. Calculating the shortest paths by minimizing the sum of the delays of the bridge lines of the chart that are crossed does not lead to an efficient routing path.

In the document by V. Conan, J. Leguay, T. Friedman, "The heterogeneity of inter-contact time distributions: its importance for routing in delay tolerant networks", arxiv:cs.NI/0609068, the "Spray and Wait" algorithm, introduced by M. Grossglauser and D. Tse, "Mobility increases the capacity of ad-hoc wireless networks", Transactions on Networking, vol. 10 no. 4, pp. 477-486, August 2002, is applied. This makes it possible to deal only with the case of nodes that can be reached in two hops and not in any number of hops. The message delivery rate is, consequently, low and the delay longer than by implementing the inventive method. Furthermore, the optimization algorithm used to find the solution is exponential in time, so a sub-optimal solution is therefore proposed.

Despite the efficiency of the methods of the prior art, the latter do not make it possible to provide a routing method that minimizes the delivery delays on the scale of a whole network.

The object of the invention is based on the implementation of a multiple-hop method for transporting messages. The message can be relayed in succession by a number of nodes before reaching its destination.

SUMMARY OF THE INVENTION

The invention relates to a routing method in a network with intermittent connectivity, characterized in that it comprises, to determine the routing information, for an opportunistically-defined routing, at least the following steps:

for a network comprising a number n of nodes, kmax being the maximum number of relays to be considered in the routing, and $M_1$, a matrix of size n×n, the estimates of the average inter-contact times for the nodes i and j are initialized $M_1 = \langle t_{ij} \rangle$, k+1 corresponding to the number of relays considered for the routing, initialize k=0, and, in the step k:

for each pair of nodes (i,j) (with 1<=i<=n, 1<=j<=n, i≠j), estimate the delay with (k+1) hops and the list of the corresponding relays from $\langle \lambda_{ij} \rangle$ matrix of the inverses of the average inter-contact times and estimates of the delays with k hops present in $M_k$, store the estimated inter-contact delays in the matrix $M_{(k+1)}$ (i,j) and the list of the corresponding relays $V_i(d)^{k+1}$, $(M_{(k+1)}(i,j), V_i(d)^{k+1})$ where $V_i(d)^{k+1}$ corresponds to the list of the relay nodes considered at the node i when a message must be transmitted to the destination d, for a number of relays k+1, if k+1=kmax, stop the steps, otherwise, do k=k+1.

Thus, the routing of a message to the node d, which is transmitted or relayed by the node i, is performed by transferring the message to the nodes belonging to $V_i(d)^{kmax}$.

According to one embodiment, the steps are stopped when $M_k = M_{k+1}$.

The method can include at least the following steps:

for a destination d, consider the list of the average times $\langle e_{I,d} \rangle$ estimated in the step k in $M_k$, I varying from 1 to n, carry out an ascending sort of the values of these average times, $L = e_{L1,d} < e_{L2,d} < \ldots < e_{Ln,d}$, where L corresponds to a list in ascending order, for a source node s, define the set of the nodes I of the relays to be found, initialize this set $I = \phi$ let result be the value corresponding to the estimate of the delay between s and d with the best set I found, on initialization, result=$1/\lambda_{sd}$.

For each node $L_I$ of the list L, I varying from 1 to n:

if the node s sees the node $L_I$, and if the node $L_I$ sees the destination ($\lambda_{s,LI} \neq 0$ and $1/e_{LI,d} \neq 0$), add the node $L_I$ to the set I and test the new value of the delay with this set I by using $$E_{sd}(I) = \frac{1 + \sum_{i \in I} \lambda_{si} e_{id}}{\lambda_{sd} + \sum_{i \in I} \lambda_{si}},$$

corresponding to the delay that can be hoped for between s and d by using the set of relays/at the node s.

If $E_{sd}(I) >$ Result, then:

remove the node $L_I$ from the set I and stop the steps, I being equal to the optimum set.

Otherwise, do result=$E_{sd}(I)$, accept the node in the set I, and the delay value becomes the current minimum value, store the result value in $M_{k+1}(s,d)$ and the set I in $V_s(d)^{k+1}$.

Return result.

The invention also relates to a routing system making it possible to obtain routing information, characterized in that it includes one or more nodes with at least the following elements:

a history management module, a data message reception module, comprising a buffer memory, a forwarding decision module making it possible to decide which messages are transferred to a node when it comes back into contact, a forwarding module for transferring the messages to the neighbors, a routing information computation module suitable for executing the steps of the method described hereinabove, an eligibility module participating in the forwarding decisions taken in the forwarding decision module.

Advantages

The inventive method notably offers the following advantages:

messages can be transported in a single copy or in multiple copies; one or more copies of the message can exist at each instant in the network, the method is decentralized: each node chooses independently of the others the relays that can be used to transmit the message or the data from a source node to a recipient node, the optimum choice of relay is made in a dependent manner, it is obtained as the fixed point of a convergent series that converges in a number of steps, for example, at most equal to the diameter of the interconnection chart, the solution minimizes the delivery delay while retaining a low complexity, the complexity in the worst case is assessed at: $L*n^2*D$, with L being the width of the connectivity chart, n the number of nodes and D the average degree of the chart, the connectivity chart having more often than not "small world" properties, the real complexity is then reduced. L then becomes log(n) and D<<n. The algorithm implemented converges with the width of the chart, the solution provides a loop-free routing, that is, a message never passes twice through the same node.

BRIEF DESCRIPTION OF THE DRAWINGS

Other features and advantages of the present invention will become more apparent from reading the following description, given by way of illustration and in a nonlimiting manner, with appended figures which represent.

DETAILED DESCRIPTION

In order to better understand the inventive method, the following description is given by way of illustration and in a nonlimiting manner, in the context of a network where messages are transported with a single copy. The network can be a data transport network, which consists of mobile and wireless communicating entities such as cell phones, sensors or even PDAs.

The data are transmitted, or routed, in this type of network, in the form of messages (called bundles) containing self-sufficient information that is transferred from entities to entities, atomically, using the TCP protocol for example.

The method can be implemented in software form (possibly as embedded software), in an "application" routing or "overlay" stack at the level of a node. It can also be developed in hardware form.

Figure 2:
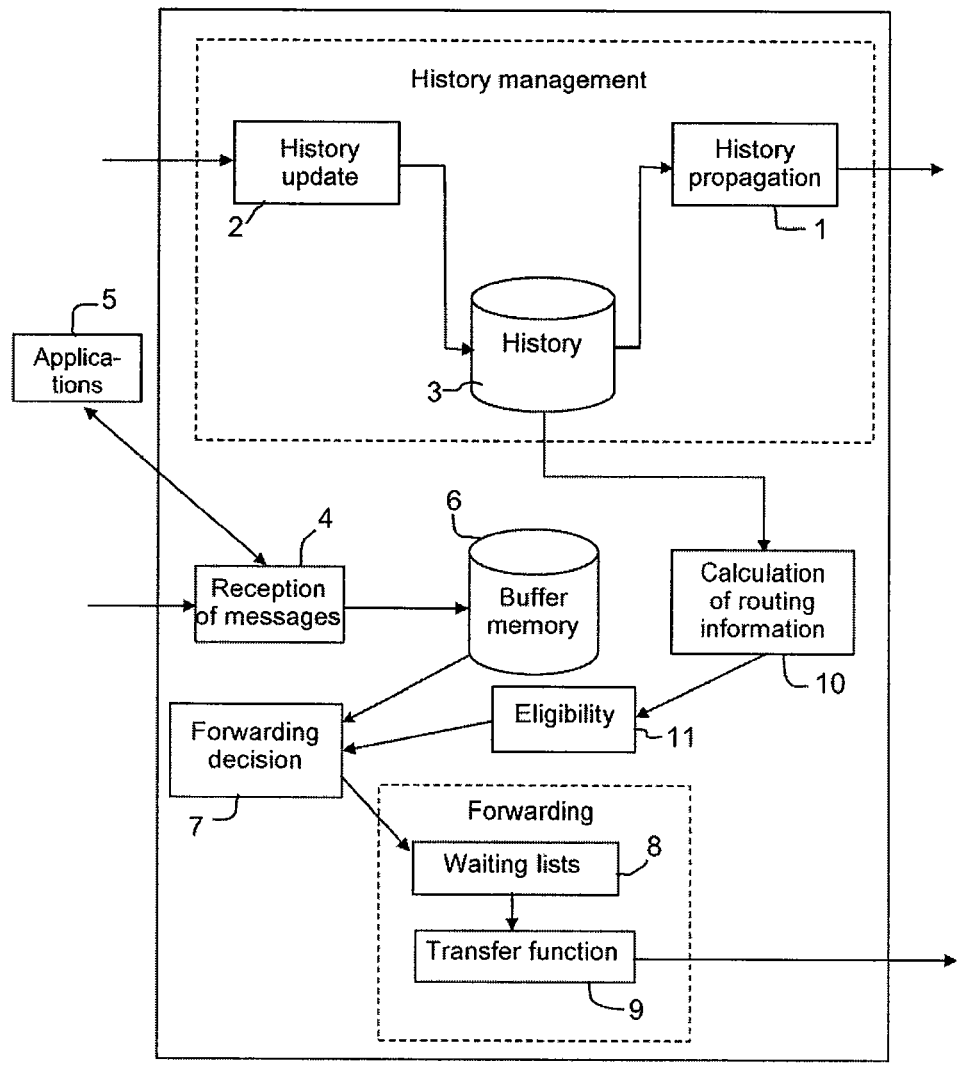

In the network, each of the nodes is provided with a processor that is suitable for implementing the following basic functions, described in relation to FIG. 2:

History propagation module, 1: a node regularly propagates the average inter-contact times that it measures. This can be done periodically or be triggered opportunistically according to methods known to those skilled in the art. The nodes can decide, for various reasons (e.g. energy saving, network resource consumption, computation complexity), to partially broadcast this information.

Overall history update module, 2: each node receives the history information from the other nodes of the network and stores it in a data structure that can be a 2×2 matrix, 3, where a value on the row i and the column j corresponds to the average inter-contact time tij between the nodes i and j. This matrix is updated when new information is received from other nodes, related nodes or more distant nodes, the information then being relayed.

Data message reception module, 4: this function is called by the processor when a message containing data is received by a node. If the message is intended for the current node, it is then transferred to the relevant applications, 5 (there may be a mail client for example). Otherwise, the current node stores the latter in a buffer memory 6 in order to transfer it subsequently.

Forwarding decision module, 7: this function is invoked when a new node comes into the vicinity of a node (that is, upon each new contact). Its aim is to decide which messages to transfer to the node N. For each message M addressed to the node $d_M$ that is not already programmed for transfer to the neighbor N, two things are checked:

That the node N does not already have M.

That M is "eligible" relative to the node N. The concept of eligibility is explained in the detail of the "eligibility of a node" function, this function ruling on the latter.

If the two conditions are true, the message M is then placed in the waiting list 8 for a future transfer to N.

Message transfer module, 9: this function transfers the messages present in the stand by or waiting list 8 of the node encountered. It should be noted that there is a waiting list for each node that is in contact with the current node and that said list is reset to zero when the nodes are no longer in contact or when all the messages have been transmitted.

Calculation of the routing information, 10: in the context of a routing process, when this function is invoked periodically. Thus, the node i constructs, for each destination node d, from the inter-contact time matrix, a subset of nodes $V_i(d)$.

Eligibility of a node, 11: in order to rule on the eligibility of a relay node r that is in contact, at a given instant t, with the current node. For a message intended for the node d, this function checks whether r is present in the set $V_i(d)$. If this check is true, the node r is declared eligible, otherwise it is declared ineligible.

Figure 1:
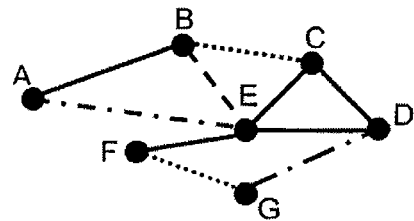
FIG. 1, an exemplary network with intermittent connectivity according to the prior art, FIG. 2, an exemplary functional architecture of a node on which the to steps of the inventive method are executed, FIG. 3, a message transfer scheme within a network with intermittent connectivity, FIG. 4, an illustration of the calculation method with two hops, according to the invention, FIG. 5, an exemplary transfer from a node A to another node in only two hops.
Figure 3:
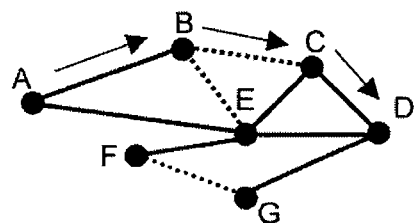

FIG. 3 represents an example of the routing of a message from a first node A to a second node D. In this example, the following notations are used:

$V_A(D)=\{B\}$; A transmits the message to B, $V_B(D)=\{C,E\}$; corresponds to the set of nodes eligible to B. That is, B could transmit the message to C or E, but it transmits it to C, because it is the first that it encounters, $V_C(D)=\{D\}$; C transmits the message to D. Thus, little by little, and passing through the relays B and C, the message sent by the node 1 A is transmitted to the node D.

One of the objectives of the present invention is to define, for each node i serving as a relay for a message or even as a source sending messages or data, and for any recipient node d, the set of eligible neighbors $V_i(d)$ that are used for the transfer of the messages to d.

The steps of the method that makes it possible to transport data or messages by minimizing the delay are detailed hereinbelow.

To determine the set of eligible nodes, the method executes, for example, the steps described hereinbelow:

Main Algorithm

Prerequisites: each node i knows the matrix $<\lambda_{ij}>$, of size n×n (n being the number of nodes) corresponding to the inverses of the average inter-contact times between the nodes i and j. This matrix is calculated, for example, from the matrix containing the $<t_{ij}>$ corresponding to the average inter-contact times between the nodes i and j. These matrices remain unchanged during the calculation. These matrices can be calculated offline, or else each node estimates the average inter-contact time with its neighbors and broadcasts this information to the other nodes of the network.

Steps:

Let $M_1$ be a matrix of size n×n.

$M_1 = <t_{ij}>$ (the matrix $M_1$ corresponding to the average inter-contact times for the nodes i and j is initialized).

k=1, a single relay is considered, k corresponding to the relay set up in the network In the step k+1:

for each pair of nodes (i,j) (with 1<=i<=n, 1<=j<=n, i≠j), do $(M_{(k+1)}(i,j), V_i(d)^{k+1})$="two-hops calculation" algorithm (i, j, $<\lambda_{ij}>$, $M_k$); that is, estimate the delay with (k+1) hops from $<\lambda_{ij}>$ inverse matrix of the matrix of the average inter-contact times and of the delay estimates with k hops present in $M_k$, store the estimated inter-contact delays in the matrix $M_{(k+1)}(i, j)$ and the list of the relays $V_i(d)^{k+1}$ making it possible to achieve these results the list of corresponding relays.

The steps of the method stop when a so-called fixed point is reached for a fixed value of $M_k$.

For example, the method can be stopped when $M_k = M_{k+1}$. We then have $M = M_k$ and, for any pair i,d, $V_i(d) = V_i(d)^k$.

Result: the algorithm provides as output:

a matrix M containing the estimate of the delay for each pair of nodes (i, j), i.e., the delay that is hoped for a message going from the node i to the node j using the inventive routing process.

The list of the relays $V_i(d)$ corresponding to the list of the relay nodes considered at the node i when a message must be transmitted to the destination d.

The main algorithm uses an algorithm that is designated "two-hops calculation", which calculates, for each pair of source or relay, destination nodes (i,d), the set I of nodes that are neighbors of i in the connectivity chart (i.e. the nodes u with which $\lambda_{iu} \neq 0$) to be used as relays to reach d. This function also provides an estimate of the delay named $E_{i,d}(I)$ that is a function of the selected set I. This function can be defined in several ways according to the objectives to be achieved insofar as the series $M_k$ of the "fixed point calculation" algorithm converges.

Since the series of the matrices $M_k$ is convergent, the routing delays decrease according to the number of iterations made. The minimum delay for all the pairs of nodes is reached at the fixed point.

Once this is done, when a node i has to relay a message intended for the destination d, it then calculates or recovers $V_i(d)$, the set of the possible relays to which to transmit the message to reach the destination d. As soon as it encounters a node belonging to $V_i(d)$ it transfers the message to it.

According to a variant embodiment, the method uses a "two-hops calculation" subfunction that makes it possible to choose the set of relays in the context of a two-hops relay process, in order to optimize the delays.

It is assumed that a node s can be linked with the recipient node d in an average time $e_{sd}$ (obtained in the step k of the main algorithm in the matrix $M_k$. This time can be equal to infinity).

The next step is to try to reduce this delay by introducing an additional relay r between the source and the destination as is represented in FIG. 3. This relay is chosen from a list of potential candidates I, calculated in such a way as to reduce the average delay between s and d.

In FIG. 3:
s represents the source node, d the destination node,
r a node that is a neighbor of s, a potential relay for the message transmitted from s to d,
$t_{sr}$ is the average inter-contact time between nodes s and r,
$e_{rd}$ is the time estimated in the step k for delivery of the message from r to d.

The introduction of the set I of intermediate relays r leads to a formulation of the delay that can be hoped for between s and d, by using the set of relays I at the node s with the formula $E_{sd}(I)$:

$$E_{sd}(I) = \frac{1}{\lambda_{sd} + \sum_{i \in I} \lambda_{si}} + \sum_{i \in I} \frac{\lambda_{si}}{\lambda_{sd} + \sum_{i \in I} \lambda_{si}} e_{id}$$

$E_{sd}(I)$ is expressed according to the average inter-contact times $t_{sr}$ (and their inverses $\lambda_{sr}$) and of the average inter-contact times $e_{rd}$ estimated in the step k of the main algorithm.

$E_{sd}(I)$ is the sum of two terms:

$$\frac{1}{\lambda_{sd} + \sum_{i \in I} \lambda_{si}},$$

the average waiting time for s to encounter the first of the relay nodes of I or the destination d, $$\sum_{i \in I} \frac{\lambda_{si}}{\lambda_{sd} + \sum_{i \in I} \lambda_{si}} e_{id},$$

the average waiting time between each relay node and the destination.

In this calculation, the inter-contact times are approached by an exponential process between all the nodes i and j.

To find the set I, the exhaustive method consists in examining all the possible cases to minimize $E_{sd}(I)$, which corresponds to $2^{d(i)}$ calculations, with d(i) the degree of the node i in the connectivity chart. The "two-hops calculation" algorithm explained hereinbelow is in O(D), D being the average degree of the nodes of the network: the average degree is the average number of neighbors of each node in the connectivity chart. The O(D) notation means that the number of operations to perform the calculation is bounded by D and gives the optimum result when the inter-contacts between the nodes i and j follow an exponential law (of parameter $\lambda_{ij}$).

Prerequisites: each node i knows the matrix $<\lambda_{ij}>$, of size n×n (n being the number of nodes), corresponding to the inverses of the average inter-contact times between the nodes i and j. Furthermore, each node has the matrix $M_k <e_{ij}>$ of the inter-contact times estimated in the step k of the main algorithm.

"Two-hops calculation" algorithm: (s, d, $<\lambda_{ij}>$, $<e_{ij}>$)

For the destination d, the list of average times $e_{I,d}$ is considered, with I varying from 0 to n. These values are sorted in ascending order, and the list L is thus obtained in ascending order:

$L = e_{L0,d} < e_{L1,d} < e_{L0,d} < \ldots < e_{Ln,d}$

For the source node s, the set of nodes I of the relays to be found is also defined. I is initialized with the empty set, or I=ϕ

A result variable stores the current value of the delay obtained. At the output of the algorithm, it provides the estimate of the delay between s and d with the best set/of relays founds.

On initialization, result=$1/\lambda_{sd}$

For each node $L_I$ of the list L, with I varying from 0 to n

If the node s sees the node $L_I$, and if the node $L_I$ sees the destination ($\lambda_{s,LI} \neq 0$ and $1/e_{LI,d} \neq 0$), add the node $L_I$ to the set/and test the new value of the delay with this set I with the formulation $$E_{sd}(I) = \frac{1 + \sum_{i \in I} \lambda_{si} e_{id}}{\lambda_{sd} + \sum_{i \in I} \lambda_{si}},$$

the delay that can be hoped for between s and d by using the set of relays I at the node s.

If $E_{sd}(I)$> result (the new value is greater than the current value) then:
remove the node $L_I$ from the set I (because it worsens the result) and stop the algorithm, the set I obtained is optimum.
Otherwise,
do result=$E_{sd}(I)$, the node $L_I$ is accepted in the set I, and this delay value becomes the current minimum value.
Return result.

Figure 4:
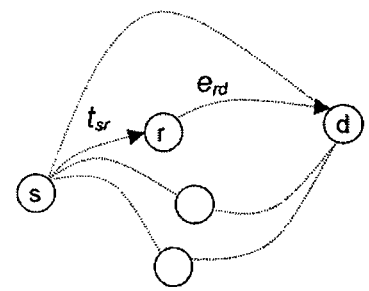
Figure 5:
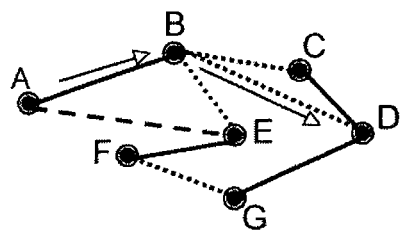

FIG. 4 represents an example of transfer from a node A to a node D in only two hops.
$V_A(D)^2 = \{E,B\}$. A transmits the message to B because it encounters B before E.
$V_B(D)^1 = \{D\}$. B waits to encounter D to transfer the message to it.

This method makes it possible, notably, to reduce the number of times the message is transmitted between the source s and the destination d. The routing process described in this document can be applied with limitations on the number of hops. It is sufficient to use the sets $V_i(d)^k$ obtained in the intermediate steps in the main algorithm to perform the relaying in a maximum of k hops. The set $V_i(d)^{k-T}$ is used at the current node when the message has already made T hops.

The method and the system described previously apply, for example, in the following domains:
in the civil domain, it is possible to envisage constructing peer-to-peer networks based on the short range wireless capabilities (wifi, Bluetooth or Zigbee type) of the mobile terminals (portable telephones, PDAs, etc.). These urban peer-topeer networks thus enable the users to pool the resources of their mobile terminals and thus form a virtual network (data transport network).

The applications envisaged include messaging, the exchange of content, the broadcasting of localized information (from terminals).

The invention claimed is:

1. A routing method for routing a message transmitted from a source node s to a destination node d in a network comprising n nodes that are intermittently connected to each other and that act as relays for each other, the method comprising the following steps:

for each node, measuring average inter-contact times with other nodes and providing the average inter-contact times to other nodes in the network;

for each node, receiving and storing average inter-contact time information from other nodes of the network;

generating an n×n matrix $\langle\lambda_{ij}\rangle$ corresponding to inverses of average inter-contact times between nodes i and j, wherein i is an index value ranging from 1 to n and j is an index value ranging from 1 to n;

generating an n×n matrix $\langle t_{ij}\rangle$ corresponding to an estimation of average inter-contact times between nodes i and j;

setting k=1, wherein k indicates a number of relays used in a routing of a message from the source node s to the destination node d, and wherein $k_{max}$ is a maximum number of relays to be considered in the routing;

setting an n×n matrix $M_k$ equal to $\langle t_{ij}\rangle$;

computing an opportunistically defined routing method comprising the following steps:

for a pair of nodes (i, j) within the network, with 1<=i<=n, 1<=j<=n, i≠j, utilizing $\langle\lambda_{ij}\rangle$ and $M_k$ to generate estimated inter-contact delays with (k+1) hops and a list of the corresponding relays;

storing the estimated inter-contact delays in a matrix $M_{(k+1)}$ and the list of the corresponding relays in a list $V_i(d)^{k+1}$;

wherein $V_i(d)^{k+1}$ corresponds to a list of the relay nodes in the network considered at the node i when a message is transmitted to the destination node d using k+1 relays;

terminating computing of the opportunistically defined routing method if k+1=$k_{max}$ or $M_k$=$M_{(k+1)}$; and incrementing k by a predetermined value; and using $V_i(d)^k$ for routing the messages to said destination node d.

2. The method as claimed in claim 1, further comprising the following steps:

for the destination node d, generating a list L of average times $\langle e_{Li,d}\rangle$ estimated to deliver the message from a node $L_i$ to the destination node d, wherein i varies from 1 to n;

for the source node s, initializing a set of relay nodes I to a predetermined value;

initializing a current delay result to $1/\lambda_{sd}$, wherein $\lambda_{sd}$ is the inverse of an average inter-contact time between the source node s and the destination node d in the n×n matrix $\langle\lambda_{ij}\rangle$;

for each corresponding node $L_i$ in the list L, i varying from 1 to n:

adding the node $L_i$ to the set I if $\lambda_{s,Li}$ is greater than a first predetermined value and $1/e_{Li,d}$ is greater than a second predetermined value;

determining an expected delay result $E_{sd}(I)$ between the source node s and the destination node d when using the set of relay nodes I;

removing the node $L_i$ from the set I if the expected delay result exceeds the current delay result; and setting the current delay result to the expected delay result if the expected delay result is less than the current delay result; and storing the current delay result in $M_{k+1}(s,d)$ and storing I in $V_s(d)^{k+1}$.

3. The method as claimed in claim 2 wherein the step of determining the expected delay result $E_{sd}(I)$ is performed by evaluating the relationship:

$$E_{sd}(I) = \frac{1 + \sum_{i \in I} \lambda_{si} e_{id}}{\lambda_{sd} + \sum_{i \in I} \lambda_{si}}.$$

4. A routing system for obtaining routing information in a network comprising a plurality of nodes, the routing system comprising:

a history management processor for obtaining inter-contact time information from other nodes of the network;

a data message reception processor comprising a buffer memory for storing messages;

a forwarding decision processor configured to determine which stored messages are transferred to a node according to corresponding routing information when the node becomes available to receive the message; and a routing information computation processor configured to perform the steps of the method of claim 1 to generate the routing information.

* * * * *